(12) United States Patent
Ben Ezra et al.

(10) Patent No.: US 12,147,095 B2
(45) Date of Patent: Nov. 19, 2024

(54) DEVICE AND METHOD FOR CALIBRATION, MONITORING AND CONTROL OF THE INTEGRATED PHOTONIC SYSTEMS

(71) Applicant: NEWPHOTONICS LTD., Kfar-Mordechai (IL)

(72) Inventors: Yosef Ben Ezra, Petah Tikva (IL); Yaniv Ben Haim, Kfar-Mordehai (IL)

(73) Assignee: NEWPHOTONICS LTD., Kfar Mordechai (IL)

( * ) Notice: Subject to any disclaimer, the term of this patent is extended or adjusted under 35 U.S.C. 154(b) by 0 days.

(21) Appl. No.: 18/162,021

(22) Filed: Jan. 31, 2023

(65) Prior Publication Data

US 2023/0185117 A1 Jun. 15, 2023

Related U.S. Application Data

(63) Continuation of application No. PCT/IL2021/051502, filed on Dec. 19, 2021.

(60) Provisional application No. 63/146,659, filed on Feb. 7, 2021.

(51) Int. Cl.
*G02F 1/025* (2006.01)

(52) U.S. Cl.
CPC .......... *G02F 1/025* (2013.01); *G02F 2201/58* (2013.01)

(58) Field of Classification Search
CPC .............................. G02F 1/025; G02F 2201/58
USPC ......................................................... 385/1–3
See application file for complete search history.

(56) References Cited

U.S. PATENT DOCUMENTS

| | | | |
|---|---|---|---|
| 3,976,873 A * | 8/1976 | Bottka | G02F 1/015 257/432 |
| 5,159,262 A | 10/1992 | Rumbaugh | |
| 2003/0026546 A1 | 2/2003 | Deliwala | |
| 2005/0110108 A1 | 5/2005 | Patel | |
| 2012/0177318 A1* | 7/2012 | Zheng | G02F 1/025 385/1 |

(Continued)

FOREIGN PATENT DOCUMENTS

| JP | 2005123513 A | 5/2005 |
|---|---|---|
| KR | 10-0328724 B1 | 8/2002 |

OTHER PUBLICATIONS

"Dual-Function Electroabsorption Waveguide Modulator/Detector for Optoelectronic Transceiver Application", by Welstand et al., IEEE Photonics Technology Letters, vol. 8, No. 11, pp. 1540-1542 (Year: 1996).*

(Continued)

*Primary Examiner* — Robert Tavlykaev

(57) ABSTRACT

A device and methods, the device comprising: a photo detector comprising a waveguide; two metal layers connected to the photo detector; a measurement device connected between the two metal layers, for measuring an electric parameter between the two metal layers, said electric parameter indicative of an amount of light propagating through the waveguide; and a voltage source connected between the two metal layers, wherein applying voltage between the two metal layers changes a refraction index of the waveguide, thereby affecting a phase of light propagating through the waveguide, and wherein the voltage to be applied is determined in accordance with the resistance measured by the resistance measurement device.

9 Claims, 9 Drawing Sheets

(56) References Cited

U.S. PATENT DOCUMENTS

| | | | | |
|---|---|---|---|---|
| 2012/0321240 | A1* | 12/2012 | Alloatti | G02F 1/025 |
| | | | | 385/2 |
| 2013/0301979 | A1* | 11/2013 | Qian | H01L 31/105 |
| | | | | 257/E31.127 |
| 2014/0003761 | A1* | 1/2014 | Dong | G02F 1/2257 |
| | | | | 385/2 |
| 2018/0033796 | A1 | 2/2018 | Lee et al. | |
| 2019/0187495 | A1* | 6/2019 | Melikyan | G02F 1/0327 |
| 2020/0116932 | A1* | 4/2020 | Hjartarson | G02F 1/0121 |

OTHER PUBLICATIONS

"Schottky Barrier Electroabsorption Modulator/Detector for Optical Fiber Communication" by Goodwin, PhD Thesis (Year: 1995).*
ISR and WO for PCT/IL2021/051502 (May 3, 2022).

* cited by examiner

DEVICE AND METHOD FOR CALIBRATION, MONITORING AND CONTROL OF THE INTEGRATED PHOTONIC SYSTEMS

TECHNICAL FIELD

The present disclosure relates to photonic systems in general, and to a method and device for calibrating, monitoring and controlling photonic devices, in particular.

BACKGROUND

Photonics is the physical science of light (photon) generation, detection, and manipulation through emission, transmission, modulation, signal processing, switching, amplification, and sensing.

Photonic systems are gaining more and more popularity in all areas, such as but not limited to light detection, telecommunications, information processing, photonic computing, lighting, metrology, spectroscopy, holography, medicine (surgery, vision correction, endoscopy, health monitoring), biophotonics, military technology, laser material processing, art diagnostics, material processing, art diagnostics involving InfraRed Reflectography Xrays, UltraViolet fluorescence, XRF), agriculture, robotics, and others.

Some important uses of photonic systems include transmitting and receiving information, multiplexing and demultiplexing information, or the like. Photonic devices may include but are not limited to photo detectors including photo diodes or photo transistors, laser diodes, light-emitting diodes, solar and photovoltaic cells, displays and optical amplifiers. Other examples include devices for modulating a beam of light and for combining and separating beams of light of different wavelength.

The need for photonic devices arises from the limits and limitations of electronic devices. A first limit relates to the transfer rate of information, and is due to electron speed saturation. A second limitation arises from the high power consumption of electronic devices, and thus the generated heat and the cost. The use of photonic devices provides for higher rates, with little heating, thus curing or easing these problems.

BRIEF SUMMARY

One exemplary embodiment of the disclosed subject matter is a device comprising: photo detector comprising a waveguide; two metal layers connected to the photo detector; a measurement device connected between the two metal layers, for measuring an electric parameter between the two metal layers, said electric parameter indicative of an amount of light propagating through the waveguide; and a voltage source connected between the two metal layers, wherein applying voltage between the two metal layers changes a refraction index of the waveguide, thereby affecting a phase of light propagating through the waveguide, and wherein the voltage to be applied is determined in accordance with the resistance measured by the resistance measurement device. Within the device, the photo detector optionally further comprises: a p-doped region, an n-doped region, and a waveguiding intrinsic region, wherein the device further comprises a second p-doped region and a second n-doped region, wherein the second p-doped region and the second n-doped region are doped to a higher level than the p-doped region and the n-doped region. Within the device, the device is optionally positioned on a Silicon dioxide layer positioned over a silicon layer. Within the device, the value of the electric parameter is optionally measured for assessing parameters of the photo detector. Within the device, value of the electric parameter is optionally measured for assessing amount of light going through the photo diode and the voltage is applied for controlling the amount of light. Within the device, the electric parameter is optionally resistance or conductance. Within the device, the measurement device is optionally an Ohmmeter or an Amperemeter.

Another aspect of the disclosure is a method for generating a calibration model for a device, a system or a subsystem comprising: obtaining indications of control parameters affecting the behavior of the device, a system or a subsystem; obtaining a plurality of value sets, each set of the value sets comprising input parameter values; obtaining values to be applied, and applying the values to the control parameters; measuring values of output parameters the device, system or subsystem as obtained in response to applying the control parameter values; determining a calibration model of the device, system or subsystem, based on the at least one set of measured input parameters, applied values of the control parameters and the values of the output parameters; and storing the calibration model. The method can further comprise obtaining one or more characteristics for the control parameters, wherein the characteristics are selected from the group consisting of: a value range, and a resolution. The method can further comprise measuring an impulse response of the circuit. The method can further comprise measuring a relaxation time of the photocarriers. Within the method, the calibration model is optionally further based on a physical model of the device, a system or a subsystem. Within the method, the calibration model is optionally further based on a mathematical model of the device, a system or a subsystem.

Yet another aspect of the disclosure is a method for calibrating a device, a system or a subsystem comprising: receiving values for the input parameters; receiving required values for output parameters; determining using a calibration model of the device, a system or a subsystem, values for control parameters to be applied, in order to obtain the required values for the output parameters; and storing the calibration model. Within the method, one of the input parameters is optionally a temperature, one control parameter is optionally phase shifter voltage, and one of the output parameters is optionally resistance or conductance, indicative of a phase of light propagating through a waveguide. Within the method, the resistance or conductance is optionally indicative of a phase of light propagating through a waveguide. The method is optionally performed offline.

Yet another aspect of the disclosure is a method for monitoring and controlling a device, system or subsystem, comprising: receiving a measurement of an input parameter; obtaining from a model of the device, system or subsystem, a value for at least one control parameter for obtaining a required value of an output parameter of the device, system or subsystem; and applying the value of the at least one control parameter. Within the method, one of the input parameters is optionally a temperature, one control parameter is optionally phase shifter voltage, and one of the output parameters is optionally a resistance or conductance. Within the method, the resistance or conductance is optionally indicative of a phase of light propagating through a waveguide. The method is optionally performed online. Within the method, the device, system or subsystem is optionally initially operated with values for control parameters determined during an offline calibration stage.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Photonics relates to light generation, detection, and manipulation through emission, transmission, modulation, signal processing, switching, amplification, and sensing.

Photonic systems are gaining popularity in multiple uses in a variety of areas.

The need for photonic devices arises from the limits and limitations of electronic devices, including the transfer rate of information, and the high power consumption of electronic devices, and thus the generated heat and the cost.

The use of photonic devices reduces these problems, but photonic devices are also not problem-free. A first problem may be their physical sizes. While the sizes of electronic devices may be in the order of magnitudes of a few nanometers, the sizes of current photonic devices is in the order of magnitude of tens of micrometers. Their relatively large sizes also increase the sensitivity of the devices to manufacturing problems, due for example to variations in the manufacturing process between different areas of the same device.

Another problem of photonic devices is their significant sensitivity to size or shape deviations and to environmental conditions such as temperature changes, or the like. Thus, a slight deviation in the manufacturing process, or a temperature that is slightly different than intended, may lead to a component that is not of the designed size, and thus its functionality is significantly decreased.

Therefore, in certain circuits, some electronic devices may be replaced with photonic devices, where the tradeoff is positive. For example, photonic devices may be used in cases where high rate is required, but not when multiple components are required and the available physical area is limited.

Figure 1:
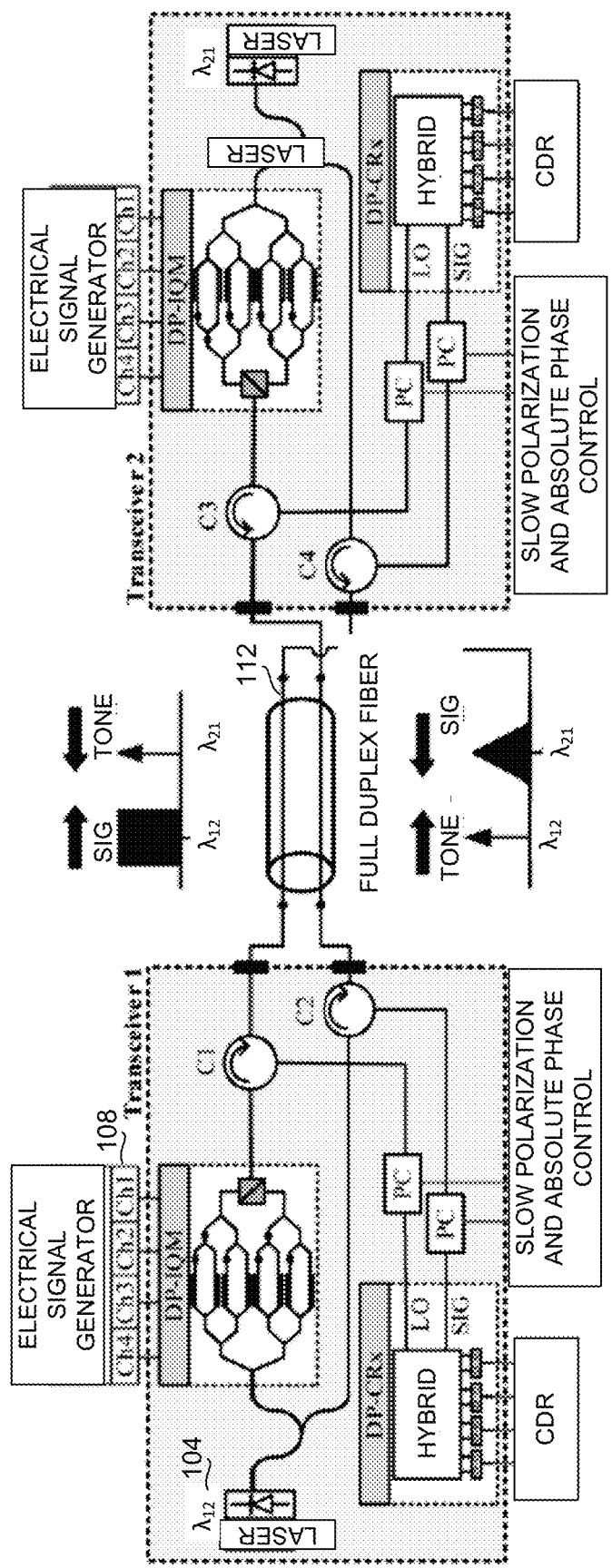
FIG. 1 shows an example of a coherent-light transceiver, which uses a plurality of photonic devices.

Referring now to FIG. 1, showing an example of a coherent-light transceiver, which uses a plurality of photonic devices, in order to decode a received wavelength 104 in accordance with electrical signal 108, and transmit it over a full duplex fiber 112 to a corresponding receiver, and vice versa.

If any of the components behaves other than expected, due to manufacturing fluctuations, temperature effects, or other reasons, the resulting signal is not as expected, and the performance of the system degrades.

Figure 2:
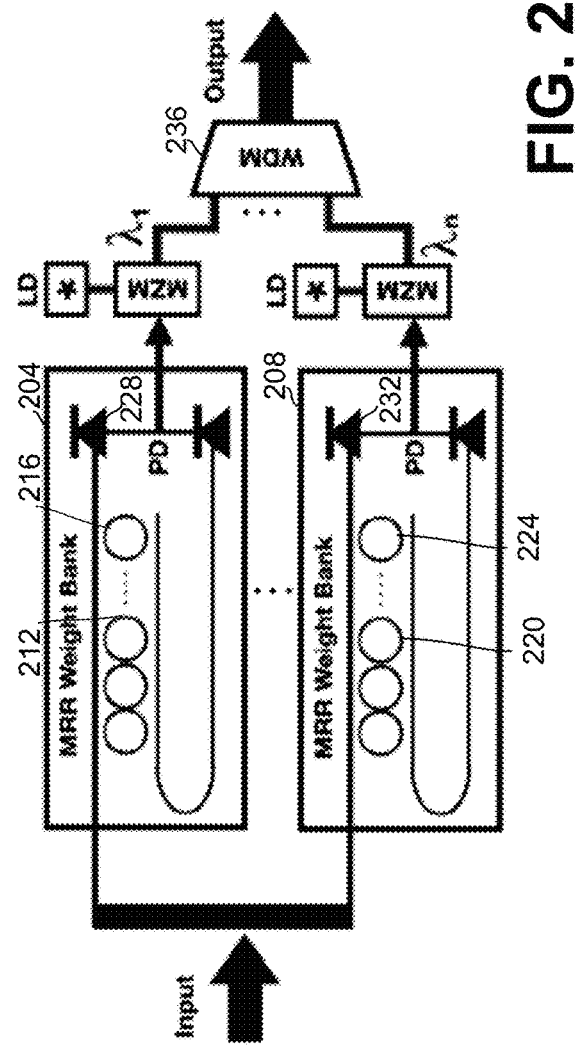
FIG. 2 shows a device providing a photonic implementation of a Convolutional Neural Network (CNN) implementing a broadcast-and-weight protocol.

Referring to FIG. 2, showing another example of a device providing a photonic implementation of a Convolutional Neural Network (CNN) implementing a broadcast-and-weight protocol. In this design, each of two or more Micro Ring Resonators (MRR) 212, 216, 220 and 224, and photodiodes such 228, 232. The MRRs perform Multiply and Accumulate (MAC) operations while broadcast-and-weight protocol carry MAC results across layers. In broadcast-and-weight protocol each neuron output is multiplexed onto a distinct light wavelength such as $\lambda_1 \ldots \lambda_n$ using Laser Diodes (LD). Multiplexed wavelengths are bundled together by Wavelength Division Multiplexing 236 and placed on a waveguide to broadcast to the destination layer.

At the destination layer, each neuron receives all the incoming wavelengths. Each wavelength is then multiplied in amplitude with its corresponding micro ring. Multiplication is carried out by tuning rings in and out of resonance to a respective laser wavelength. Later, a photodiode sums up all the incoming wavelengths into an aggregate photocurrent.

It will be appreciated that each ring, such as 212, 216, 220 and 224 resonates those wavelengths for which its perimeter is an integer multiply of, thereby creating constructive interference.

Thus, slight variations in the diameter of one or more rings, due for example to manufacturing deviations or temperature changes, may cause the ring not to transmit the correct wavelength, and not provide the expected constructive interference. The device may thus not output the expected output.

Multiple further examples may exist which demonstrate the sensitivity of a system comprising photonic devices, for example silicon optical filters reconfigured from a Benes switch matrix of various sizes.

It will be appreciated that the more photonic devices a circuit comprises, for example the larger the Benes switch matrix, the more sensitive the circuit is, as errors may accumulate and create reflections, destructive interferences or other problems.

Figure 3:
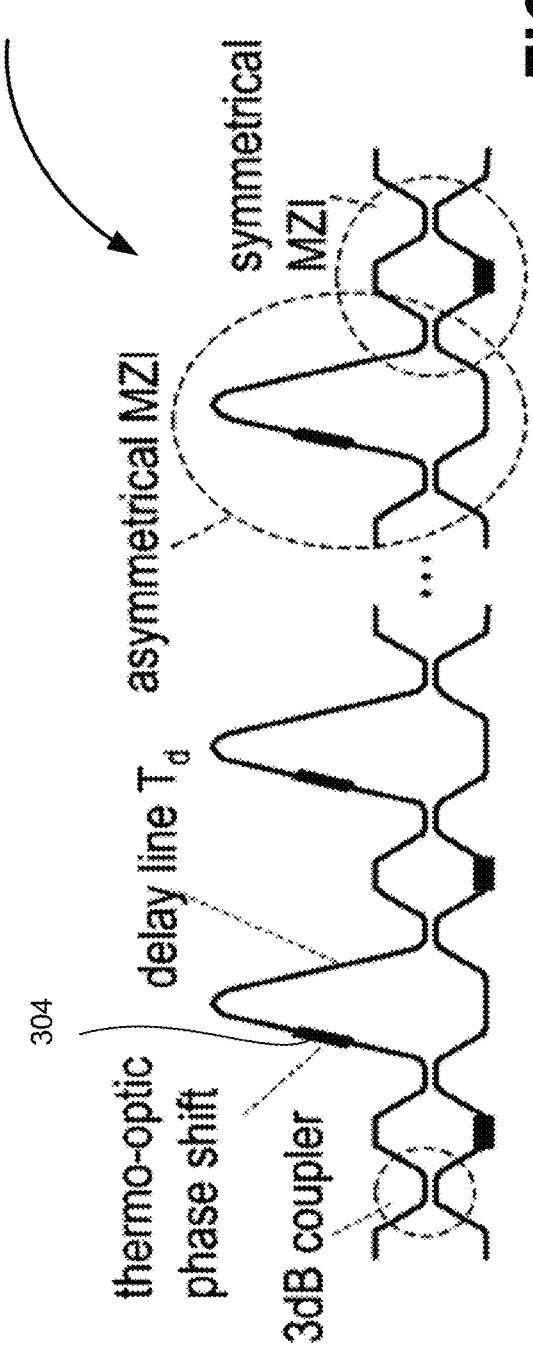
FIG. 3 shows an illustration of a schematic structure of an integrated optical finite impulse response (FIR) lattice filter.

FIG. 3 shows an illustration of a schematic structure of an integrated optical finite impulse response (FIR) lattice filter, implemented by cascading symmetrical and asymmetrical Mach Zehnder Interferometer (MZI), wherein MZI with arms of equal length are denoted symmetrical MZI while those with arms of different length are denoted asymmetrical. With a tunable phase shift element on the MZI arms, the symmetrical MZI is a variable coupler controlling the amount of power that is directed into the upper or lower arm. The asymmetrical MZI is a fixed-delay and variable-phase-shift element. With this kind of filter structure, a FIR lattice filter with variable complex coefficients is obtained. The filter order is determined by the number of cascaded symmetrical and asymmetrical MZI pairs. For a filter of an order of 1, symmetrical MZIs have to be interleaved by asymmetrical ones. This filter is a photonic device which is sensitive to manufacturing, temperature and other fluctuations. For the proper operation of the device a thermo-optic shifter 304 is used for correct phase matching.

In order to monitor photonic devices, some prior art methods split the energy of the received light, and use a fraction of the light for assessing the wavelength offset and phase shifting of the system. However, such splitting reduces the received energy, and further splitting for monitoring additional components further reduces the energy, which may eventually amount to significant energy loss. Moreover, such splitting may cause reflections which may further impair the output. Furthermore, assessing the degradations using these methods does not enable to correct the output, since the physical structure and state of a component is fixed.

Thus, one problem of the disclosure is the need to monitor the performance of a photonic device, and determine whether it provides the expected output.

Another problem of the disclosure is the need to correct those parameters that deviate from the expected performance of such devices, for example correct phase shifting of a photonic device, if one is detected, in order to ensure its proper operation.

Yet another problem of the disclosure is the need to perform the assessment and correction of the behavior of a photonic device in a non-invasive manner, without affecting the device itself and without allocating a certain part of the carried energy for assessment purposes, thereby avoiding energy waste.

Yet another problem of the disclosure is the need to perform the monitoring and control of a photonic device using a single device rather than a first device for monitoring and a second one for control, thus reducing the footprint of the correctional device and the wasted energy.

Yet another problem of the disclosure is the need to perform the monitoring and control of the behavior of a photonic device in the context of a circuit in which it is installed. Since interrelations such as reflections may exist between components, a different behavior may be observed between a photonic device standalone or within a circuit, and different corrections may be required.

Yet another problem of the disclosure is the need for a consistent way of creating a calibration model for the behavior of a photonic device or a system or subsystem comprising the same. Such model may then be used for monitoring and control of the behavior of the device or circuit in runtime.

FIGS. 4-7 below shows exemplary all-optical circuits of transmitters and receivers.

Figure 4:
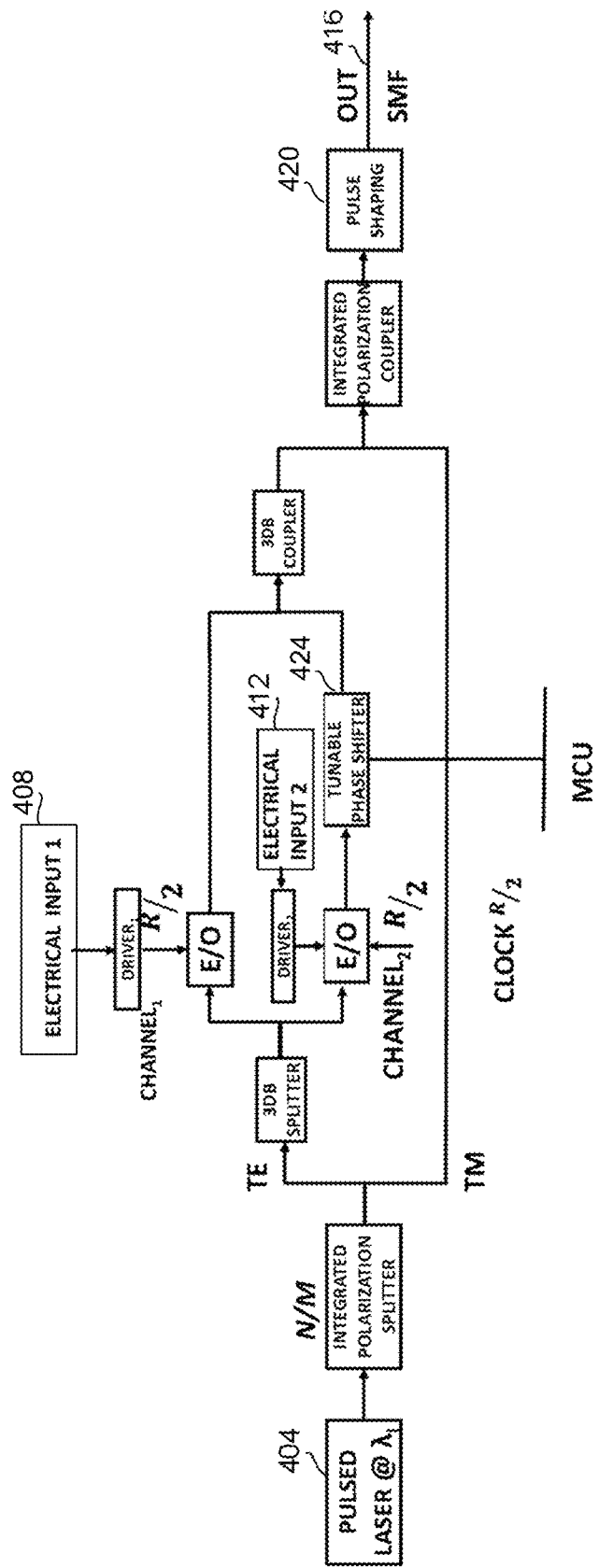
FIG. 4 shows a schematic diagram of a transmitter with TDM, in accordance with some exemplary embodiments of the disclosure.

FIG. 4 shows a transmitter with all-optical multiplexing, operating with time-division multiplexing (TDM) by Pulsed Lasers, wherein the clock is transmitted on the polarization orthogonal to the signal. The multiplexer receives a pulsed laser 404 of a certain wavelength $\lambda_i$, electrical input 1 (408), electrical input 2 (412), and outputs a multiplexed channel 416 at a bit rate as the pulsed laser, and clock at half the bit rate in TM mode.

Figure 5:
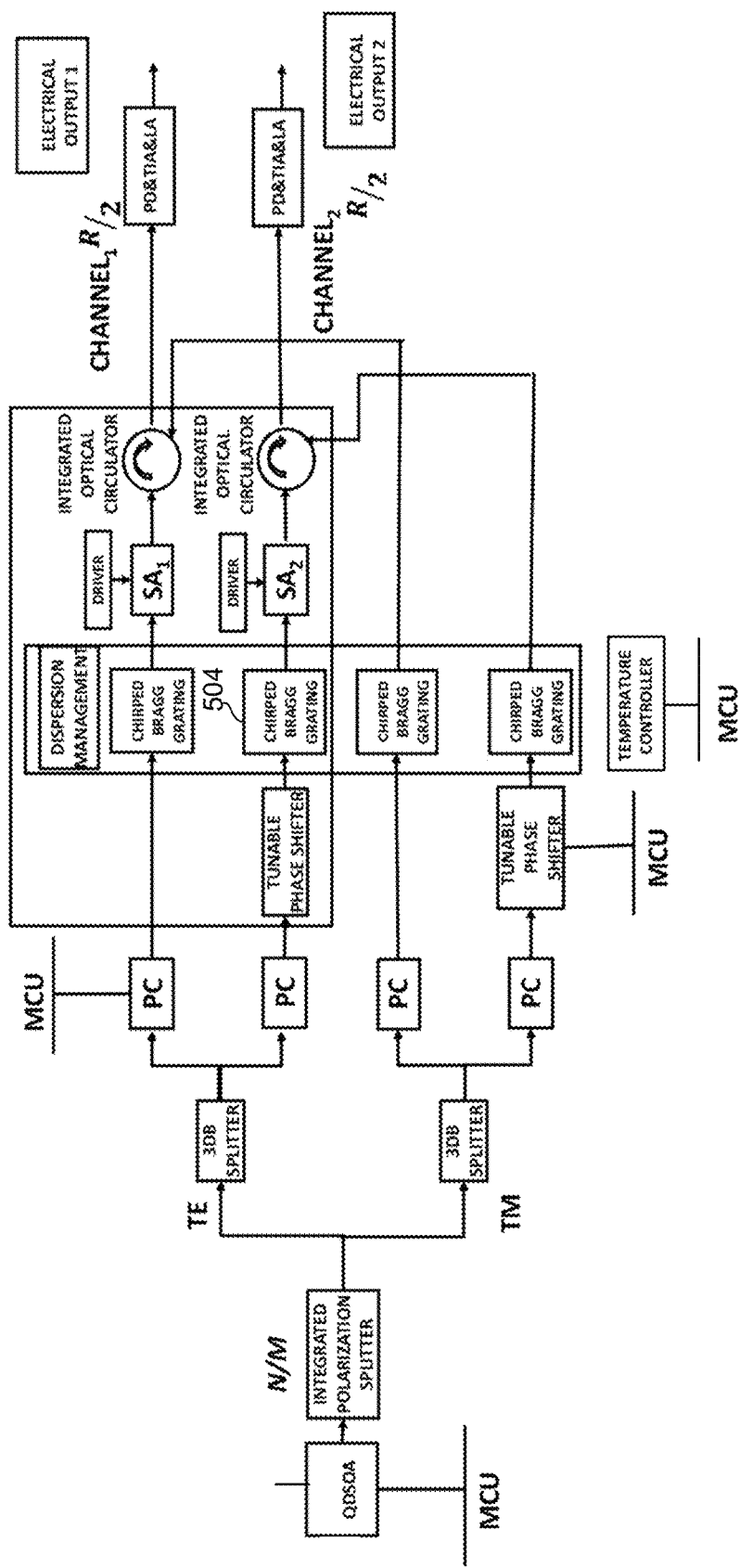
FIG. 5 shows a schematic diagram of a receiver corresponding to the transmitter of FIG. 4, in accordance with some exemplary embodiments of the disclosure.

FIG. 5 shows a corresponding all optical demultiplexing receiver, operating with time-division multiplexing (TDM) by Pulsed Lasers, wherein the clock is transmitted on the polarization orthogonal to the signal.

The transmitter-receiver pair of FIGS. 4-5 operate by splitting the input laser pulse into data and clock by polarization, such that they do not affect one another.

Figure 6:
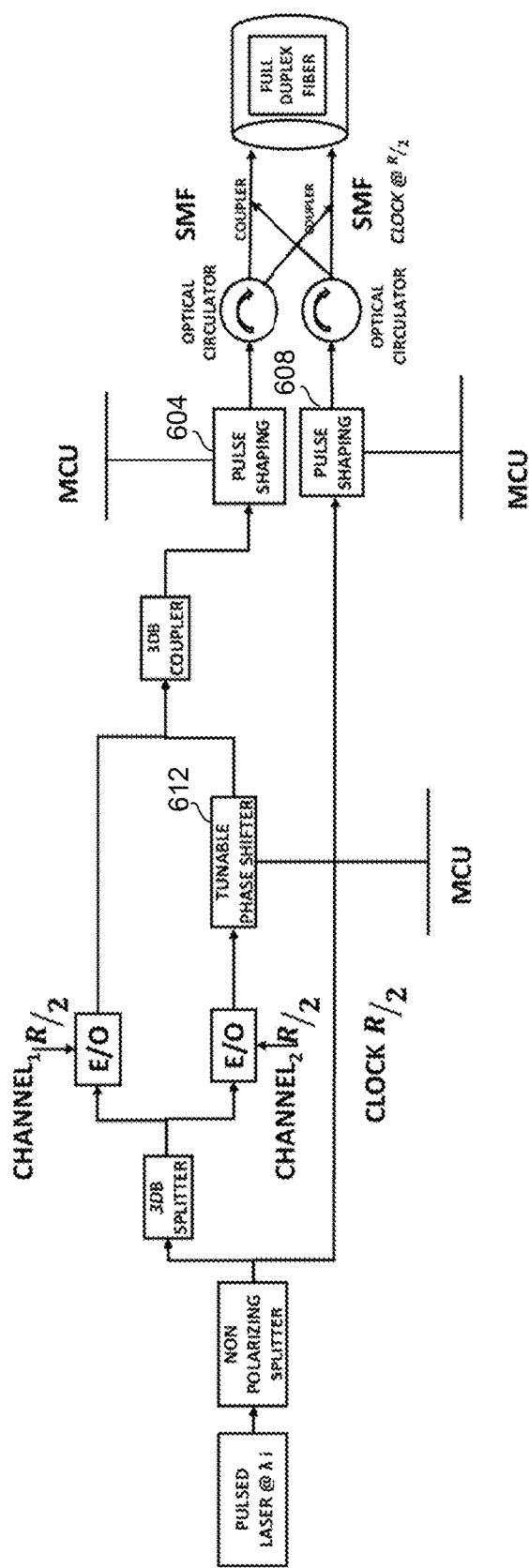
FIG. 6 shows a schematic diagram of another transmitter with all-optical multiplexing, in accordance with some exemplary embodiments of the disclosure.
Figure 7:
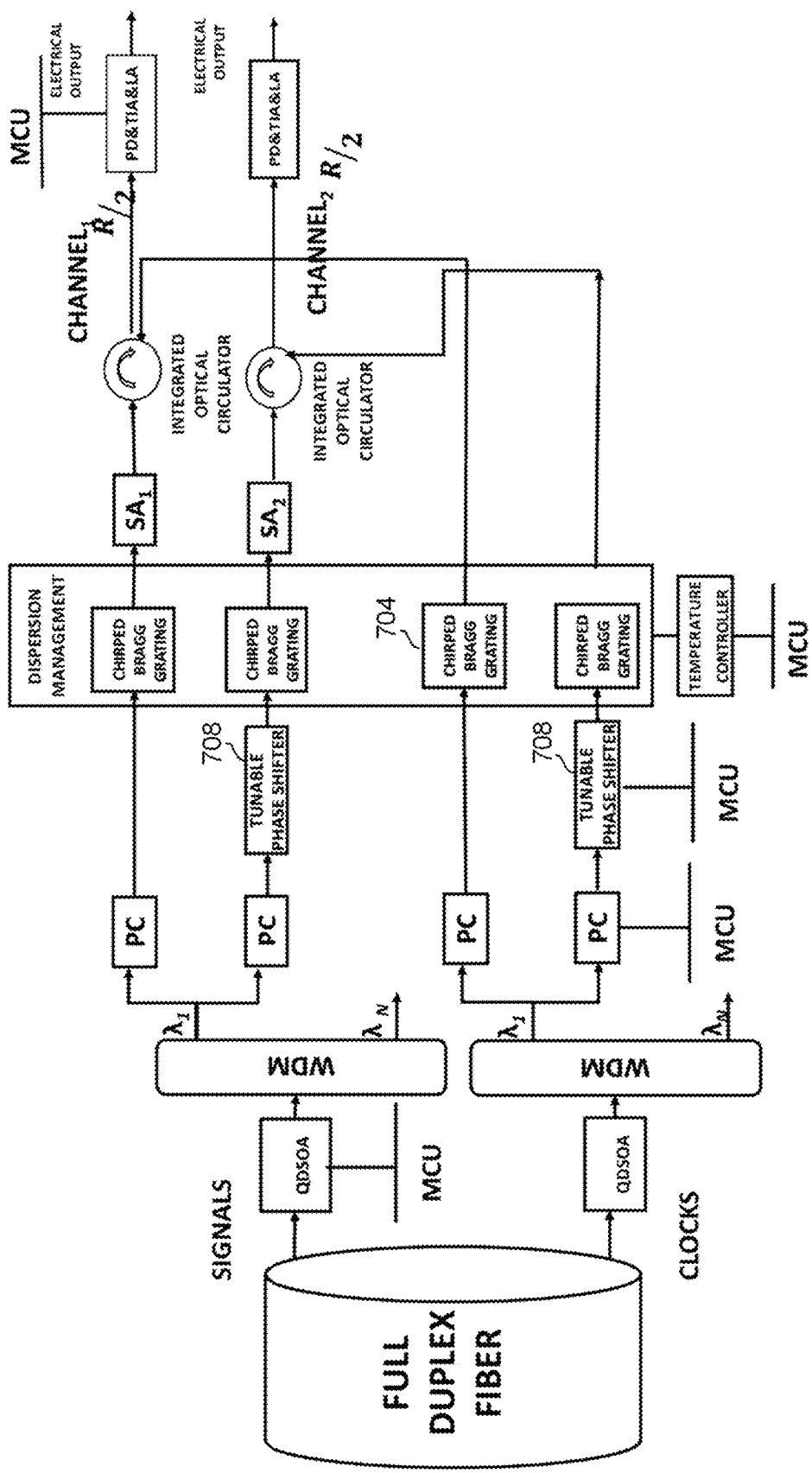
FIG. 7 shows schematic diagram of a receiver corresponding to the transmitter of FIG. 6, in accordance with some exemplary embodiments of the disclosure.

FIG. 6 shows a transmitter with all-optical multiplexing, operating with time-division multiplexing (TDM) by Pulsed Lasers with a full duplex fiber, and FIG. 7 shows a corresponding receiver.

The transmitter-receiver pair of FIGS. 6-7 operate by splitting the input laser pulse into data and clock into different fibers, thus ensuring that they do not affect one another.

It will be appreciated that each of the circuits of FIGS. 4-7 comprises a plurality of photonic devices, and that the operation of each circuit is heavily dependent on the proper operation of its components. Thus, it is crucial that the required components are calibrated in the context of the circuit, and are monitored during usage. If a deviation from the required behavior is detected, a correction needs to be introduced as well.

One technical solution of the disclosure is a device for monitoring and controlling the phase of a photonic device. The monitoring device comprises a PIN photo diode, comprising a $P^-$ region, a waveguide through which the measured light propagates, and an $N^-$ region. The device further comprises two metal contacts, connected to the $P^-$ and $N^-$ regions through $P^+$ and $N^+$ regions, respectively, intended for creating ohmic contact.

As the light propagating through the waveguide creates free electrons and holes, it reduces the resistance/increases the conductance of the device. Thus, the resistance/conductance, which is measurable, is indicative of the amount of propagating light. On the other hand, applying voltage to the device changes the electron and holes concentration, thereby changing the refraction index of the waveguide, which may shift the phase of the propagating light, and change its amplitude due to the effect of the phase on constructive or destructive interferences. Thus, a phase shifter may be created for monitoring and controlling the phase of the light propagating through a waveguide.

Another technical solution of the disclosure relates to offline creation of a calibration model of a photonic device or a system or subsystem comprising the same. The model may then be used when specimens of the device are available, for individual offline calibration of each device, including determining its working points.

The term input parameters may be widely construed to include any existing parameter of the device, environment or circuit, which may be measured and which may affect the behavior of the device, system or subsystem, such as temperature, jitter, noise, or the like.

The term control parameters may be widely construed to include any parameter that may be applied to the device, system or subsystem, such as various temperatures, voltages or currents.

The term output parameters may be widely construed to include any parameter that indicates a performance factor of the device, system or subsystem, such as amount of propagated light, bit error rate, or the like.

During model generation, different sets of input parameters may be provided and different values of one or more control parameters may be set. The output parameters may be measured under these conditions. The sets of input parameters, control parameters and outputs may be used by mathematical, physical and/or AI techniques for generating a model.

At a further stage, when specimens of the device are available, individual offline calibration may be performed for each device. The input parameters may be measured and provided to the model, required output parameters may be obtained, for example from the requirements, and values may be obtained for the control parameters, such that the device, system or subsystem operates and provides the required output. The values may be referred to as a working point.

When the device, system or subsystem are in use, and operated for example in accordance with a working point as determined during offline calibration, the model may receive measurements of input parameters, and provide values for the control parameters for fine control of the device, system or subsystem, in order to obtain the required values of the output parameters.

Enhancing the control parameters may be performed continuously in order for the device, system or subsystem to provide the required output in accordance with the existing and optionally changing conditions of the environment and the system.

In an example, a model of a device may be created and used which may control the phase of propagating light as described above. In this case the input parameter may be the temperature, the control parameter is the applied voltage, and the output parameter is the resistance, which is indicative of the amount of light.

Thus, during the calibration model generation, the temperature may be measured, different voltages may be applied, and the corresponding resistance may be measured. A calibration model of the device may be determined empirically, analytically or using a combination thereof, for example by combining measurements with a mathematical or physical model of the photonic device, to obtain the model. The model, which may be used for offline calibration of the device, and for online monitoring ad control, may indicate for each measured temperature and required resistance, which voltage needs to be applied in order to reach the required resistance, and hence the required phase of the propagated light. The model, which may be expressed as an analytical function, a look up table, or the like, may be provided to a micro controller (MCU) which controls the measurement and the voltage application of the device, and stored in the MCU.

Another technical solution of the disclosure relates to measuring the relaxation time of photocarriers after the propagation of a light pulse. When a light pulse starts propagating, the concentration of electrons and holes increases, and then decreases during a relaxation time. The relaxation curve is affected by the material properties, such as the amount of contamination or defects in the semiconductor making up the photonic device, or others. Thus, using the voltage source and the resistance measurement device provides for measuring the relaxation time, and may provide information about the properties of the material and the manufacturing process.

Yet another technical solution of the disclosure relates to the voltage source and resistance or photocurrent measurement device enabling for studying the impulse response and transfer function of the photonic device in response to discontinuous pulses of light.

One technical effect of the disclosure provides for a single device enabling the calibration, monitoring and control of one or more parameters of a photonic device, such as the light phase of a light phase shifter. The single device provides for reducing the footprint, power consumption, installation costs, and operation costs of different devices used for monitoring and control of photonic devices.

Another technical effect of the disclosure provides for calibrating, monitoring and controlling one or more photonic devices within a system or a subsystem, thus ensuring that the system or a subsystem as a whole works as expected, rather than operating on each photonic device separately, which may expose the system or subsystem to unexpected inter-effects which may harm its performance.

Yet another technical effect of the disclosure provides for offline generation of a calibration model for monitoring and controlling a device, a system or a subsystem, as well as to offline calibration of a specific device as standalone or as part of a system or subsystem, and to online monitoring and control of the device or system, or subsystem Yet another technical effect of the disclosure provides for studying additional parameters and characteristics of the photonic devices and their manufacturing process, or of systems comprising the same.

Figure 8:
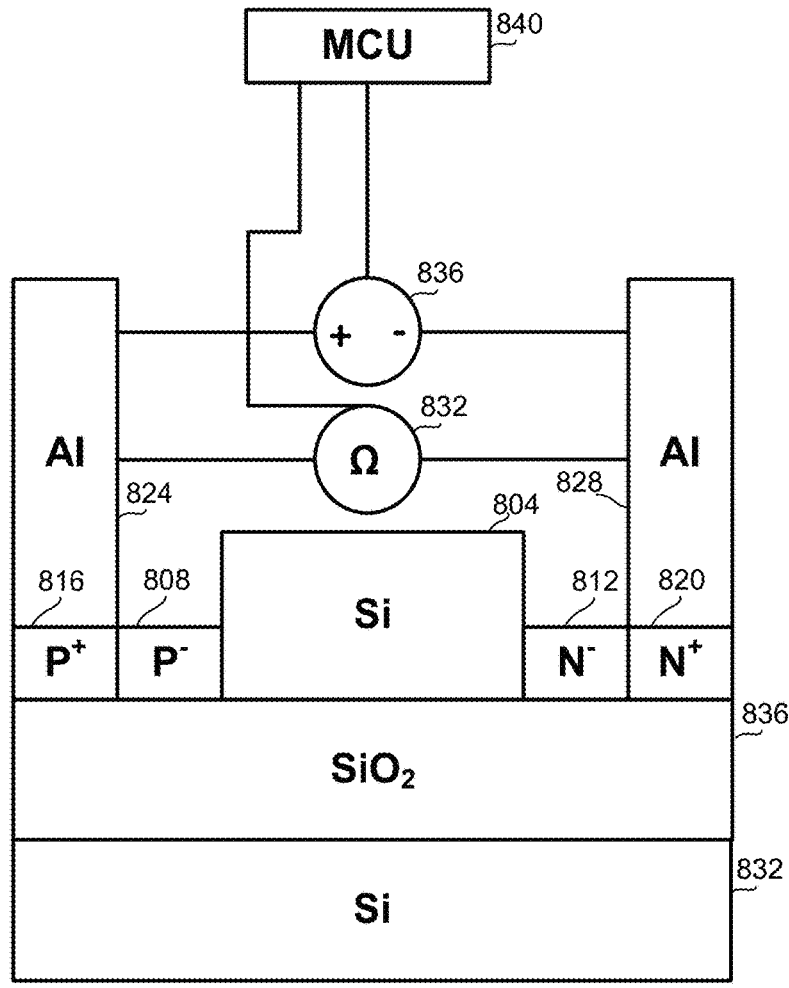
FIG. 8 is a schematic illustration of a device for monitoring and controlling a photonic device, in accordance with some embodiments of the disclosure.

Referring now to FIG. 8, showing a schematic illustration of a device for monitoring and controlling a photonic device, in accordance with some embodiments of the disclosure.

The device comprises a photodetector, comprising a $P^-$ doped region 808 and an $N^-$ doped region 812, and a waveguide 804 positioned therebetween, made for example of Silicon. The photodetector and waveguide 804 may be placed on Silica ($S_iO_2$) layer 838, placed over a silicon ($S_i$) substrate 832.

The device further comprises two metal layers 824 and 828, made for example of Aluminum (Al), and a $P^+$ doped region 816 and an $N^+$ doped region 820, which create ohmic contact with metal layers 824 and 828. It will be appreciated that $P^+$ doped regions 816 and $N^+$ doped region 820 are doped to a higher level than $P^-$ doped region 808 and an $N^-$ doped region 812.

It will be appreciated that the disclosed P type-Intrinsic-N type (PIN) structure is exemplary only, and multiple other constructs and materials may be used, for example rib waveguide PIN.

The device may comprise a resistance or photocurrent measurement device 832 such as an ohmmeter or Amperemeter, and a voltage source 836. Ohmmeter 832 and voltage source 836 may connect to a microcontroller unit (MCU) 840. Ohmmeter 832 may report to MCU 840 the measured resistance.

In the offline model generation stage, a model may be generated and stored on MCU 840. During offline calibration stage the model may be used for determining the correct voltage to be applied, and during monitoring and control stage the model may be used for determining the correct voltage to be applied and providing a corresponding command to voltage source 836, such that the concentration of electrons and electron holes in the P-N junction increases or decreases, thereby changing the refraction index at waveguide 804 and changing the phase of the guided light by the required amount.

It will be appreciated that the voltage may be placed in reverse or forward bias.

The disclosed structure may be used with any quired component of the devices for monitoring and controlling the amount of light. For example, pulse shaping 420 or tunable phase shifter 424 of FIG. 4, pulse shaping 604 or 608 or tunable phase shifter 612 of FIG. 6, chirped Bragg grating 504 of FIG. 5, or chirped Bragg grating 704 of FIG. 7 may be implemented as the phase shifter shown in FIG. 3. In order to monitor and control the device, thermo optic phase shift 304 of FIG. 3 may be implemented as the device of FIG. 8, and thus monitored and controlled.

Figure 9:
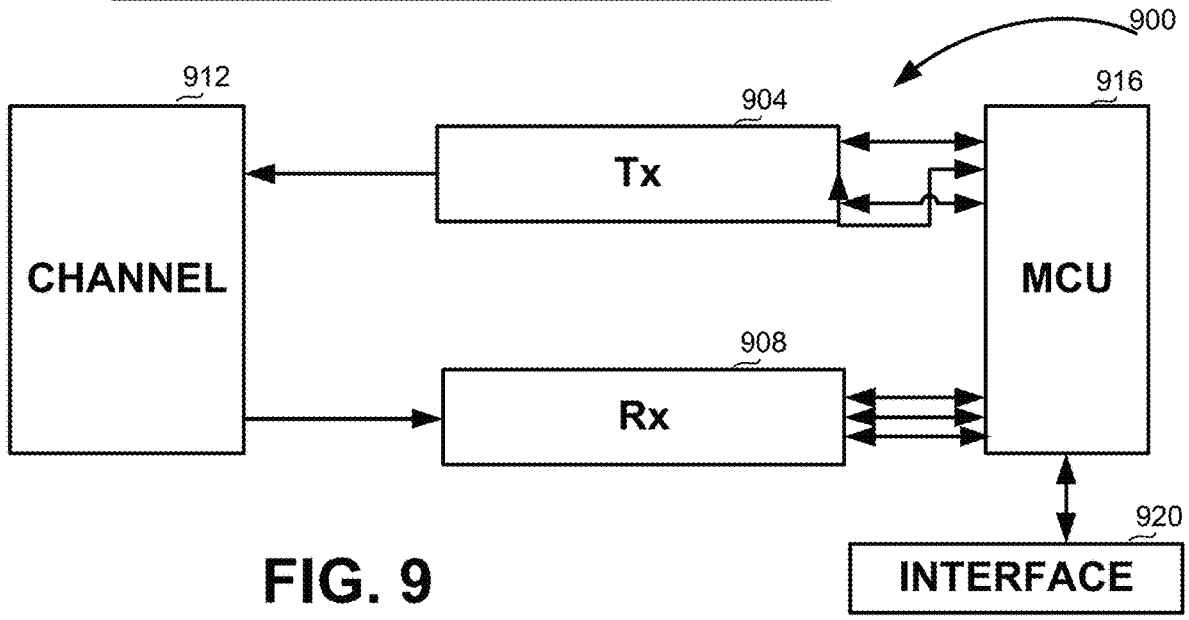
FIG. 9 is a schematic circuit in which the device of FIG. 8 can be used, in accordance with some embodiments of the disclosure.

Referring now to FIG. 9, showing a schematic circuit in which the disclosed device may be used. The circuit, generally referenced 900, comprises a transmitter 904 and receiver 908, such as but not limited to the transmitter and receiver of FIGS. 4 and 5, the transmitter and receiver of FIGS. 6 and 7, or any other implementation involving photonic devices. Transmitter 904 may transmit information to channel 912 and receiver 908 may receive information from channel 912. Thus, transmitter 904, receiver 908 and channel 912 may all influence the performance of the system. Thus, it may be insufficient to assess the performance of one or more components of transmitter 904 or receiver 908, or even transmitter 904 or receiver 908 as a whole, but rather it may be required to assess the performance of the entire system.

The required values for ensuring that the system provides the required output may be stored within MCU 916 as part of a calibration model. It will be appreciated that MCU 916 may be accessed via interface 120, which may comprise an I/O device such as a display, a keyboard, a pointing device such as a mouse or a touch screen, or the like.

Figure 10:
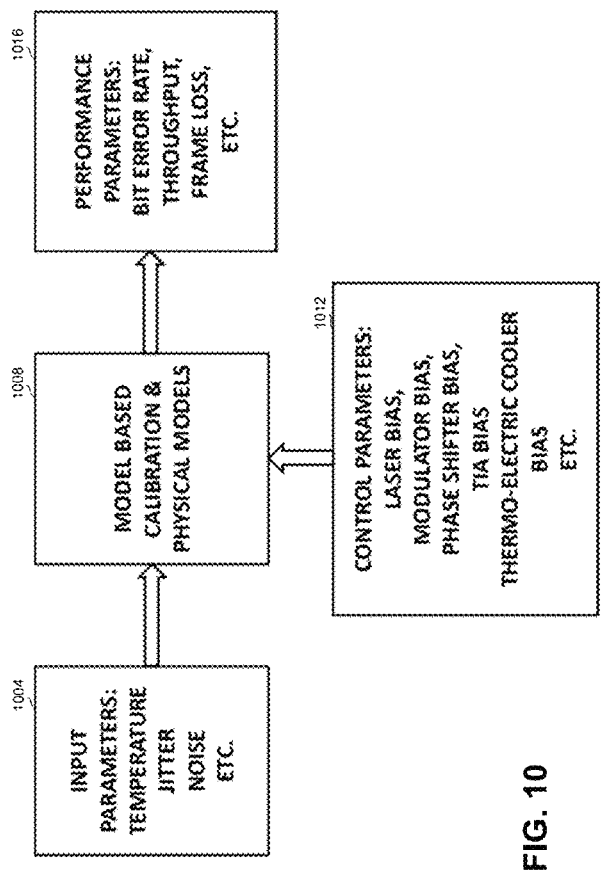
FIG. 10 is a schematic illustration of the entities associated with the calibration model of a device, a system or a subsystem, in accordance with some embodiments of the disclosure.

Referring now to FIG. 10, showing a schematic illustration of the entities associated with generating a calibration model of a device, a system or a subsystem, such as the schematic circuit of FIG. 9 above, or any of the circuits of FIGS. 4-7 above. The calibration model may be generated offline, for example during design of the system. The model may subsequently be used during offline calibration when a circuit is available for testing, and further used during online monitoring and control when the system is used.

Model based calibration and physical models 1008 may receive sets of input parameters 1004 related to the circuit and the environment, such as temperature, clock jitter, noise such as laser noise or others, or the like. These parameters may be measured by any appropriate equipment, and may be reported manually or automatically through appropriate interfaces.

During the model generation, model-based calibration and physical models 1008 may further receive indications for input parameters 1012 that may be controlled, and characteristics thereof, such as the range, accuracy or resolution. For example, the parameters may include laser bias, modulator bias, phase shifter bias, TIA bias, thermo electric cooler bias, or the like, each with its own characteristics.

The applicable output or performance of the system may be expressed as one or more output parameters 1016, also referred to as response parameters, such as but not limited to bit error rate, throughput, frame loss, or the like.

Measurements of input parameters 1004, values of control parameters 1012, and values output parameters 1016 may be used by model-based calibration and physical models 1008 for generating a calibration model. A table may be created which correlated the values of the input parameters such as temperature and jitter, controlled parameters such as V phase shifter, I laser, V modulator or V amplifier, and output parameters such as Bit error rate. Table 1 below shows an example for such table:

TABLE 1

| Input Params. (1004) | | Control Params. (1012) | | | | Output (Response) Params. (1016) |
|---|---|---|---|---|---|---|
| Temp. | Jitter | V phase shifter | I laser | V modulator | V amplifier | Bit error rate |
| 300° K | 10 pS | 2 V | 10 mA | 2 V | 5 V | $10^{-6}$ |
| 300° K | 10 pS | 3 V | 20 mA | 2.5 V | 5.5 V | $2 * 10^{-6}$ |
| 300° K | 10 pS | 4 V | 30 mA | 3 V | 6 V | $3 * 10^{-6}$ |

Thus, under the conditions of temperature of 300 degrees Kelvin and jitter of 10 pS, a bit rate of $2*10^6$ may be achieved by applying the following controls parameters: a phase shifter voltage of 3V, a laser current of 20 mA, a modulator voltage of 2.5V, and an amplifier voltage of 5.5V.

It will be appreciated that Table 1 is exemplary only, and is merely intended to demonstrate the relations between the measurements, the controls to be applied and the output of the circuit. In some situations, more input parameters, control parameters or output parameters may exist. In further situations, some parameters of a same type may exist, for example a filter of order 3 may require three phase shifter voltage values.

In the example of the phase shifter disclosed above, the control to be applied is the voltage, and the output is the resistance, which is indicative of phase of the propagated light.

Figure 11:
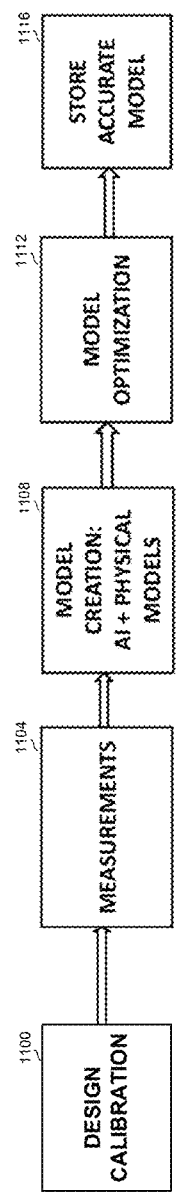
FIG. 11 is a flowchart of a method for generating a calibration model of a device, in accordance with some embodiments of the disclosure.

Referring now to FIG. 11, showing a flowchart of a method for generating a calibration model, in accordance with some embodiments of the disclosure.

At step 1100 the model generation process may be designed, including for example determining the input parameters such as temperature, the control parameters such as input voltage; and the output (response) parameters such as resistance, bit error rate, or the like. For the input, control and output parameters, some characteristics may be determined, such as: resolution, wherein higher resolution may be more accurate but may take longer due to more measurements needed to be performed and more processing time for determining the model; feasible or recommended value ranges, for example values that are more energetically efficient, or provide for longer life expectancy of a device, or the like; constraints, or the like.

It will be appreciated that various experiment design strategies or methodologies may be applied for reducing the time and cost of the data collection. Some non-limiting examples of the optimized designs may include: A-optimal, V-optimal, D-optimal, Sobol sequences, or others.

On step 1104, the input parameters may be measured (or optionally set if possible), the values of the controlled parameters may be applied, and the resulting output measurements may be taken. For example, voltage may be applied, and the resulting resistance may be measured, and based on this measurement an appropriate bias voltage may be determined for the required phase adjustment. The measurements may be summarized in a data structure similar to Table 1 above.

Based on the measurements, at step 1108, a model may be created based upon the discrete points expressed for example as rows in Table 1. The model may be based on mathematical techniques such as linear or nonlinear regression, Gaussian process regression, or the like, on AI techniques such as neural networks (NN), deep NN, shallow NN, clustering, dimension reduction, or the like.

Any known physical model of one or more devices may be used and may be integrated into the model. In some embodiments, the model may be unified and may combine all the controlled parameters and all output parameters. In other embodiments, for example when some parameters are orthogonal to each other, the model may be implemented as two or more separate and optionally simpler models.

On step 1112 the model may be optimized and made more accurate, using for example mathematical techniques, computing techniques, or the like. For example, linear areas of the model may be determined and handled separately from other areas, wherein the non-linear areas may require higher resolution of the controlled parameters.

On step 1116 the model may be stored, either in the form of a formula, a look up table, a combination thereof, or any other manner. The model may be stored within the MCU, or a data storage device accessible to the MCU.

In some embodiments, if the results are insufficient, for example the output parameters do not obtain satisfactory values, a redesign of one or more devices may be performed. For example, in the device shown in FIG. 3 the phase shift depends on the multiplication of the bias voltage and the length, therefore the length of the device may be increased in order to enable greater phase without increasing the voltage. It will be appreciated that if the model was generated during design of the device, and proves to be highly complex with more than a predetermined number of parameters, it may be deduced that the design is sub-optimal and the device, system or subsystem needs to be redesigned, In addition to the calibration process, additional measurements may be performed, and their results used for assessing other aspects of the photonic device or system, or the manufacturing process. Such measurements may include the relaxation time of the circuit which may provide information regarding the material parameters and manufacturing process, and an impulse response that may provide information of the response function of the subsystems, circuits or the entire system.

Figure 12:
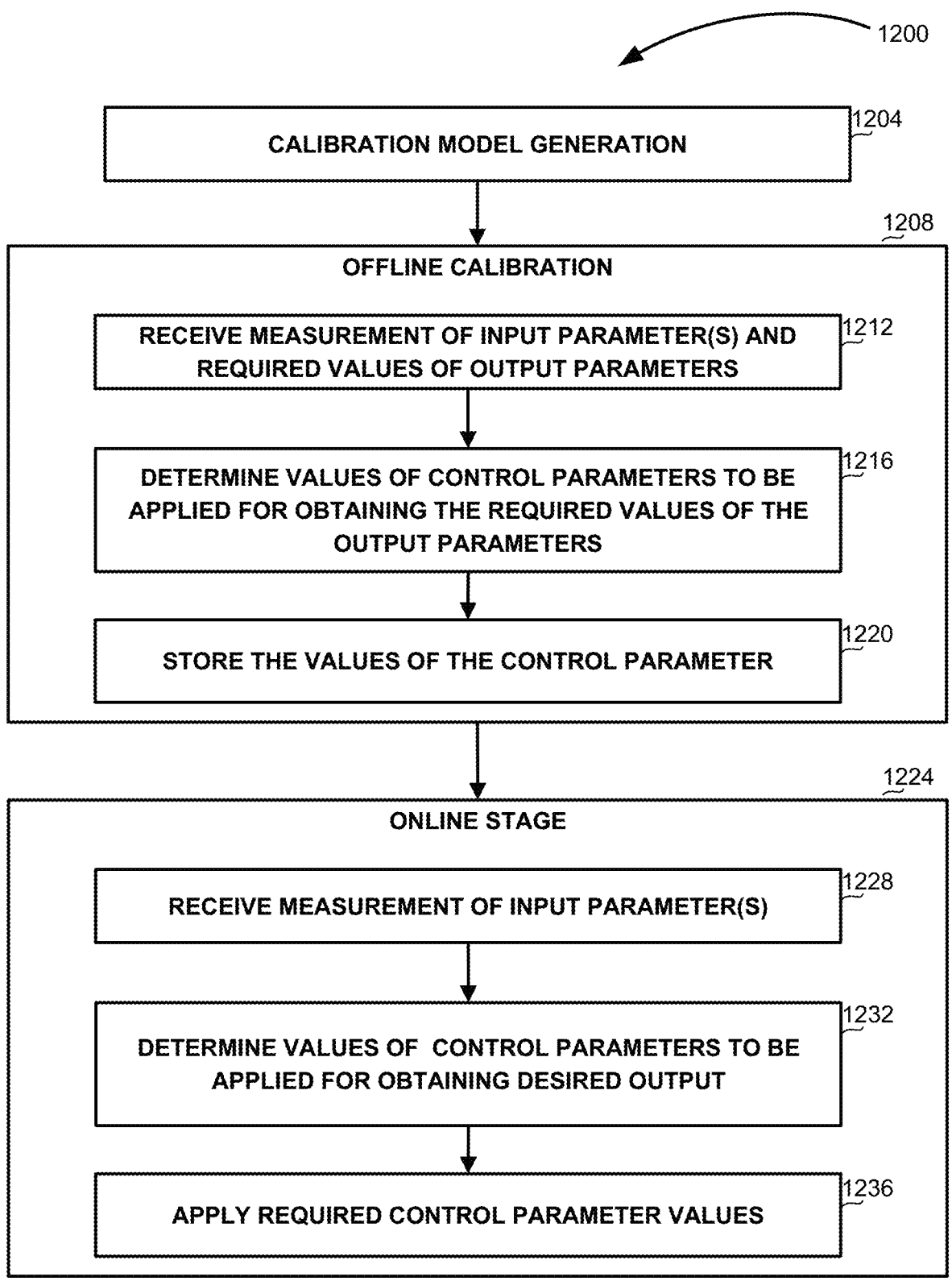
FIG. 12 is a flowchart of a method for creation and usage of a calibration model, in accordance with some embodiments of the disclosure.

Referring now to FIG. 12, showing a flowchart of a method, generally referenced 1200, for the creation and usage of a calibration model.

On step 1204, the model may be generated offline, as detailed in association with FIG. 11 above.

On step 1208 one or more devices may be calibrated offline, using the model generated on step 1204. Calibration may provide for adjusting the working point for each such device. Since photonic devices tend to be relatively large, variations in the manufacturing process exist between devices and over each device, and may have significant effect on their behavior. Thus, individual calibration may be required for each such device.

On step 1212, measurements of the input parameters and the required output parameters may be provided to the model. It will be appreciated that the combination of the input parameters as measured and the required output values may not correspond to a specific case (e.g., a specific row in the measurements table such as Table 1), therefore the model may be required to provide the recommended values for the control parameters under the existing situation. In a simplistic linear example, the value may be obtained by interpolating other values in the data used for generating the model.

On step 1216 the model may determine the required values for the control parameters that would yield the required output, and on step 1220 the values of the control parameters may be stored in association with the specific device. It will be appreciated that the plurality of rows in Table 1, wherein only a small number of the rows may correspond to the required output, may be used by the model for determining how to change the control parameters in order to obtain the required output.

On step 1224 the device may be used and online monitoring and control may be performed, in accordance with the existing and changing conditions of the circuit, the environment, or the like.

Operating the device may start with the values of the control parameters as obtained on step 1216 of the offline calibration. On step 1228 measurements of the input parameters and the required output parameters may be received by the model.

On step 1232, using the received measurements and the expected output values, the model may determine values to be applied for the control parameters to achieve the required output, similar to step 1216 of the offline calibration. The values may initially be as determined on step 1216 above, wherein enhancement may be required due to the existing and changing conditions in which the device is used.

On step 1236, the MCU may apply the determined values or the commands for setting the values, such as the required voltage between the metal layers, in order to achieve the required output, such as the required resistance which indicates the required phase of the light propagating through the waveguide, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, such as "C", C #, C++, Java, Phyton, Smalltalk, or others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A photonic device comprising:
    a PIN junction comprising a p-doped region, an intrinsic silicon bulk waveguide and an n-doped region;
    two metal layers connected to the p-doped region and the n-doped region;
    a measurement device connected between the two metal layers for measuring, non-invasively and with energy waste reduced, a value of an electric parameter between the two metal layers, said electric parameter indicative of an amount of light propagating through the waveguide; and
    a voltage source connected between the two metal layers and configured to apply a voltage between the two metal layers and thereby change a refraction index of the waveguide and non-invasively affect a phase of light propagating through the waveguide, wherein the voltage to be applied between the two metal layers is determined in accordance with the value of the electric parameter measured by the measurement device,
    wherein the photonic device is installed in a photonic system or subsystem comprising a plurality of instances of the photonic device, the system calibrated in accordance with a calibration model, wherein the calibration model is generated by:
obtaining indications of control parameters affecting a performance of each instance of the plurality of photonic devices;
obtaining a plurality of value sets, each set of the value sets comprising values of control parameters to be applied to a respective one of the plurality of instances;
obtaining respective voltage values to be applied to each of the plurality of instances, and applying the respective voltages;
measuring values indicative of the amount of light propagating through the waveguide of each of the plurality of devices in response to the respective applied voltage,
determining the calibration model of the system, based at least on the control parameters, applied voltage values and the measured values; and
storing the calibration model;
wherein the calibration model is configured to be applied by measuring values of the output parameters of the plurality of devices and applying the values of the control parameters to the plurality of devices in a non-invasive manner, and
wherein the voltage to be applied between the two metal layers to change the refraction index is determined in accordance with the value measured by the measurement device indicative of the amount of light as measured and with the calibration model.

2. The photonic device of claim 1, further comprising a second p-doped region and a second n-doped region, wherein the second p-doped region and the second n-doped region are doped to a higher level than the p-doped region and the n-doped region.

3. The photonic device of claim 1, wherein the device is positioned on a Silicon dioxide layer positioned over a silicon layer.

4. The photonic device of claim 1, wherein the value of the electric parameter is to be measured for assessing parameters of the waveguide.

5. The photonic device of claim 1, wherein the value of the electric parameter is to be measured for assessing amount of light going through a photo diode and the voltage is applied for controlling the amount of light.

6. The photonic device of claim 1, wherein the electric parameter is resistance or conductance.

7. The photonic device of claim 1, wherein the measurement device is an Ohmmeter or an Amperemeter.

8. The device of claim 1, wherein the photonic device is configured to monitor and control at least one parameter of the waveguide in a single device.

9. The device of claim 8, wherein the at least one parameter is a phase of light output by the waveguide.

* * * * *